United States Patent
Zapirain Elosegui

(10) Patent No.: US 10,130,864 B2
(45) Date of Patent: Nov. 20, 2018

(54) CYCLING TRAINING APPARATUS WITH STATIONARY MOVEMENT

(71) Applicant: OREKA TRAINING, S.L., Gipuzkoa (ES)

(72) Inventor: Garikoitz Zapirain Elosegui, Hendaya (FR)

(73) Assignee: OREKA TRAINING, S.L., Oiartzun (Gipuzkoa) (ES)

( * ) Notice: Subject to any disclaimer, the term of this patent is extended or adjusted under 35 U.S.C. 154(b) by 0 days.

(21) Appl. No.: 15/500,248

(22) PCT Filed: Jul. 16, 2015

(86) PCT No.: PCT/ES2015/070551
§ 371 (c)(1),
(2) Date: Jan. 30, 2017

(87) PCT Pub. No.: WO2016/016493
PCT Pub. Date: Feb. 4, 2016

(65) Prior Publication Data
US 2017/0246524 A1    Aug. 31, 2017

(30) Foreign Application Priority Data
Jul. 28, 2014    (ES) .................................. 201431132

(51) Int. Cl.
*A63B 69/16*    (2006.01)
*A63B 22/02*    (2006.01)
(Continued)

(52) U.S. Cl.
CPC ............ *A63B 69/16* (2013.01); *A63B 21/008* (2013.01); *A63B 21/0051* (2013.01);
(Continued)

(58) Field of Classification Search
CPC .............. A63B 69/16; A63B 2069/162; A63B 2069/161; A63B 2069/163;
(Continued)

(56) References Cited

U.S. PATENT DOCUMENTS 604,200 A * 5/1898 Vogeler ................. A63B 69/16
                                                                 482/61
4,415,152 A    11/1983 Smith
(Continued)

FOREIGN PATENT DOCUMENTS

AU    32845/84 A    3/1985
DE    33 02 187 A1    7/1984
(Continued)

*Primary Examiner* — Loan H Thanh
*Assistant Examiner* — Rae Fischer
(74) *Attorney, Agent, or Firm* — Browdy and Neimark, PLLC

(57) ABSTRACT

A cycling training apparatus including a structure that is supported on the floor and a belt that is movable with respect to the structure and forms a closed longitudinal loop on which a bicycle can be supported and ridden. The apparatus includes a securing element with two opposite ends. One end has a first connector configured to be attached to a bicycle. The opposite end includes a second connector configured to be attached to a fixed point. The securing element is flexible so that the straight line distance between these ends is variable, enabling the bicycle to move longitudinally over the belt. The connectors also allow for transversal movement and lateral tilting of the bicycle.

18 Claims, 10 Drawing Sheets

(51) Int. Cl.
*A63B 21/02* (2006.01)
*A63B 21/04* (2006.01)
*A63B 21/055* (2006.01)
*A63B 22/00* (2006.01)
*A63B 21/005* (2006.01)
*A63B 21/008* (2006.01)
*B62H 1/10* (2006.01)
*A63B 71/06* (2006.01)
*A63B 21/00* (2006.01)
*A63B 21/012* (2006.01)
*B62K 3/00* (2006.01)

(52) U.S. Cl.
CPC ........ *A63B 21/023* (2013.01); *A63B 21/0442* (2013.01); *A63B 21/0552* (2013.01); *A63B 22/0023* (2013.01); *A63B 22/02* (2013.01); *B62H 1/10* (2013.01); *A63B 21/005* (2013.01); *A63B 21/00069* (2013.01); *A63B 21/0088* (2013.01); *A63B 21/012* (2013.01); *A63B 22/0235* (2013.01); *A63B 71/0622* (2013.01); *A63B 2069/164* (2013.01); *A63B 2069/167* (2013.01); *A63B 2220/20* (2013.01); *A63B 2220/76* (2013.01); *A63B 2225/20* (2013.01); *A63B 2230/06* (2013.01); *A63B 2230/75* (2013.01); *B62K 3/00* (2013.01)

(58) Field of Classification Search
CPC ........ A63B 2069/164; A63B 2069/165; A63B 2069/166; A63B 2069/167; A63B 2069/168
See application file for complete search history.

(56) References Cited

U.S. PATENT DOCUMENTS

| | | | |
|---|---|---|---|
| 4,505,476 A | | 3/1985 | Rubin |
| 4,576,352 A | * | 3/1986 | Ogden ............... A63B 22/0023 248/188.4 |
| 4,750,737 A | | 6/1988 | Smith |
| 4,844,454 A | * | 7/1989 | Rogers ................... A61H 1/024 482/131 |
| 4,958,832 A | | 9/1990 | Kim |
| 2006/0199711 A1 | * | 9/2006 | Miers ................. A63B 21/0552 482/124 |

FOREIGN PATENT DOCUMENTS

EP  1 121 186 A1  10/1984
WO  2005/035072 A1  4/2005

\* cited by examiner

CYCLING TRAINING APPARATUS WITH STATIONARY MOVEMENT

FIELD OF THE INVENTION

The invention relates to a stationary apparatus for cycling training, and in particular to an apparatus on which a bicycle is supported, and on which the bicycle is ridden simulating real road riding conditions.

PRIOR ART

In the field of sports cycling, various methods of indoor training exist which are extremely convenient as a complement to outdoor training or when the weather conditions impede or hinder training outdoors.

Certain indoor training systems consist in static apparatuses fitted with a seat, a handlebar and pedals, simulating those of a bicycle, on which a cyclist can sit and pedal. These apparatuses are commonly known as "static bicycles", in spite of the fact that they do not have wheels and are therefore not bicycles as such. These apparatuses have the inconvenience that they do not simulate a real road pedalling experience, for example due to the fact that the apparatus is normally laterally static, so the training is incomplete. Therefore, the training requirements of more experienced cyclists and professional cyclists are not satisfied.

Alternatively, static cycling training apparatuses are known in the prior art in which the cyclist places his/her own bicycle in such a way that the bicycle is capable of being ridden on the apparatus whilst remaining static with respect to the environment (for example, a room, garage, gymnasium or similar). This second type of apparatus is more indicated for advanced cyclists, due to the fact that they can train with their own bicycle. This type of apparatus therefore favours long training sessions, similar to road sessions.

An example of an apparatus on which a bicycle is placed so that it can be ridden statically is described in patent application number EP0121186A1. The disclosed apparatus consists of a structure which rests on the floor, comprising a frame to which two rollers are coupled, the bicycle being placed on the rollers. The roller on which the rear wheel of the bicycle is placed is attached to a slot at the end which enables the position of the roller to be longitudinally adjusted depending on the size of the bicycle. The rollers are connected to each other via a transmitting chain that enables the rollers to move at the same speed. A tensioner enables the chain to be tensed regardless of the longitudinal position of the rollers. In turn, the chain is attached to a rim-type sprocket which is connected to a flexible cable that turns the blades of a fan attached to two arms that protrude from the base. As the cyclist pedals with greater intensity, the faster the fan blades move to give a more realistic feeling to that experienced when pedalling outdoors. The apparatus also comprises a longitudinal fork which is attached to the rear area of the bicycle frame by clamps; the clamps allow the frame to turn to a certain angle with respect to the fork, so that the bicycle can tilt sideways. At the opposite end to the clamps, the fork is attached to a bar which is secured to a slider which allows the bicycle to slide via a transversal sliding guide.

Another example of the prior art is patent application WO8809688A1, which shows a training apparatus fitted with rollers and an optional belt enclosed in a kind of "box". The box has a central platform on which the cyclist can stand. Two windows open up in front of and behind the central platform, through which the wheels are inserted and supported on the belt (if there is a belt) or on the rollers (if there is no belt). The belt moves within the windows and under the platform. The bicycle is laterally confined by walls, which may present inner stops to prevent strong, sudden impacts of the bicycle. Furthermore, the bicycle is secured longitudinally by means of various alternative systems. In one of them, the bicycle is secured from behind by means of rigid arms which may tilt vertically. In others, the bicycle is secured from below.

Although, in theory, the apparatuses described allow certain tilting and/or lateral movement of the bicycle on the apparatus, the pedalling experience, and in particular, the degree of similarity with the road pedalling experience can be improved. The cyclist has limited mobility, which leads to the feeling of pedalling that is not true to the reality of pedalling outdoors. On the other hand, existing static structures do not usually offer stability so that the cyclist feels totally free and comfortable pedalling naturally, without losing balance.

The present invention aims to provide a cycling training apparatus which enables the cyclist to train on a real bicycle and simulate outdoor cycling, whether seated or standing up, hence fulfilling an objective that is much sought after and desired by cyclists and cycling fans worldwide.

BRIEF DESCRIPTION OF THE INVENTION

An object of the invention is a cycling training apparatus that comprises a structure that is supported on the floor, and a belt that moves with respect to the structure and is arranged forming a longitudinal closed loop. The closed loop belt comprises an upper face for supporting a bicycle. The apparatus also comprises a securing element which limits the longitudinal movement of the bicycle on the belt preventing the bicycle from moving beyond a certain point. This securing element has two opposite ends, whereby at one end, a first connector is configured to be attached to a bicycle, and at the opposite end, a second connector is configured to be attached to a fixed point which is external to the apparatus (for example on a wall) or forms part of the structure of the apparatus. As per the invention, the securing element is flexible so that the distance between these ends is variable, enabling the bicycle to move longitudinally and/or transversally with respect to the belt, tilt laterally or present a combination of these movements once the belt is moving. Thus, the cyclist is free to pedal naturally and in a relaxed manner, even standing up. Therefore, the apparatus as per the invention reliably simulates a variety of training conditions which occur in real road cycling. Furthermore, since the bicycle offers certain longitudinal forward and backward movements, as well as transversal movement and tilting, any undesired deviation can be rectified and it is possible to brake safely, minimising the risk of loss of balance and falling off the apparatus.

The simulation of pedalling indoors in a similar way as possible to cycling outdoors, whether seated or standing up, is an objective that is much sought after and desired by cyclists and cycling fans all over the world. Therefore, achieving this, whilst enabling balanced and safe pedalling, is one of the main achievements of the invention. Fulfilling this objective will give amateur and professional cyclists a more pleasant feeling and closer to that experienced when training outdoors, leading to better training and better use of their physical potential, whilst providing greater personal and material safety.

BRIEF DESCRIPTION OF THE FIGURES

The details of the invention can be seen in the accompanying figures, which do not intend to limit the scope of the invention.

DETAILED DESCRIPTION OF THE INVENTION

The invention relates to a training apparatus that enables a user to train statically using his/her own bicycle, placing the bicycle on the apparatus and riding it practically the same way as if he/she were pedalling freely on the road.

Figure 1:
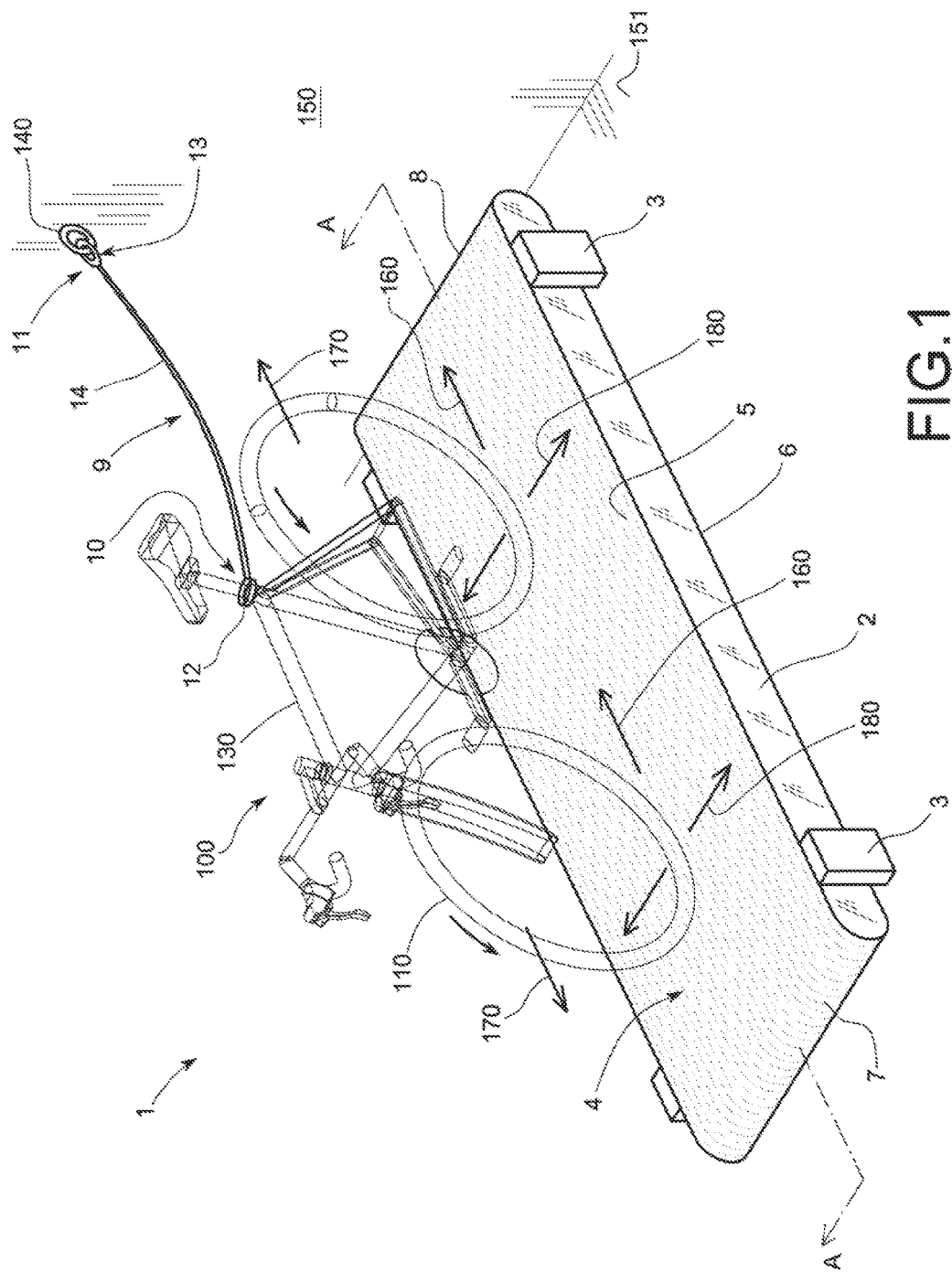
FIG. 1 shows a perspective view of a first embodiment of a training apparatus in accordance with the invention.

The illustration in FIG. 1 shows a first embodiment of the invention, consisting in a cycling training apparatus (1) comprising a structure (2) that is supported on the floor (151) via legs (3). The legs (3) enable the structure (2) to be supported at a certain distance from the floor (151). The structure (2) may be made out of aluminium, for example, although the use of other materials is also contemplated. The apparatus also includes a belt (4), arranged in a longitudinal closed loop that revolves around the structure (2). The closed loop formed by the belt (4) comprises an upper face (5), a lower face (6) and two longitudinal end sides (7, 8). The upper face (5) of the loop constitutes a support surface for the wheels (110, 120) of a bicycle (100). The upper face (5) is preferably horizontal, as shown in the figure, although other embodiments are contemplated.

The apparatus (1) as per the invention also comprises a securing element (9) fitted with two opposite ends (10, 11). The securing element (9) is arranged in a direction comprising a component in the longitudinal direction or parallel to the upper face (5) of the closed loop (horizontal direction in accordance with the layout of FIG. 1) and an optional vertical component; in other words, the securing element (9) may be horizontal or oblique. At one end (10), the securing element (9) includes a first connector (12) that can be attached to the bicycle (100), preferably to its rear area, for example to a frame (130), to a bushing or shaft of the rear wheel (120), to a seatpost or to a seat clamp. For example, in the illustrated embodiment, the first connector (12) consists of a clamp attached to the rear end of the frame (130) of the bicycle (100). At the opposite end (11), the securing element (9) includes a second connector (13) which can be attached to a fixed point (140) external to the apparatus (1), wherein this fixed point (140) can be, for example, an eyebolt secured to a wall (150). The second connector (13) can be a hook, a snap ring, a ring, or any other mechanical securing element known in the prior art, which provides a sideways (to the left and right) and vertically (upwards and downwards) articulated connection, with a great deal of freedom of movement or total freedom of movement in all directions. Furthermore, as per the invention, the securing element (9) is flexible, so that the distance between the first connector (12) and the second connector (13) is variable whilst the apparatus (1) is in use. "Distance" is understood to be the straight line distance (D) between both connectors (12, 13), indicated with a dotted line in FIG. 4. For example, the securing element (9) may comprise an elongated body (14) in the form of a chain, rope, a cable or the like, with the ability to warp and adopt different shapes, from a straighter shape in which the first connector (12) is further away from the second connector (13) and more or less curved or deformed shapes in which the first connector (12) is closer to or farther from the second connector (13).

Figure 2:
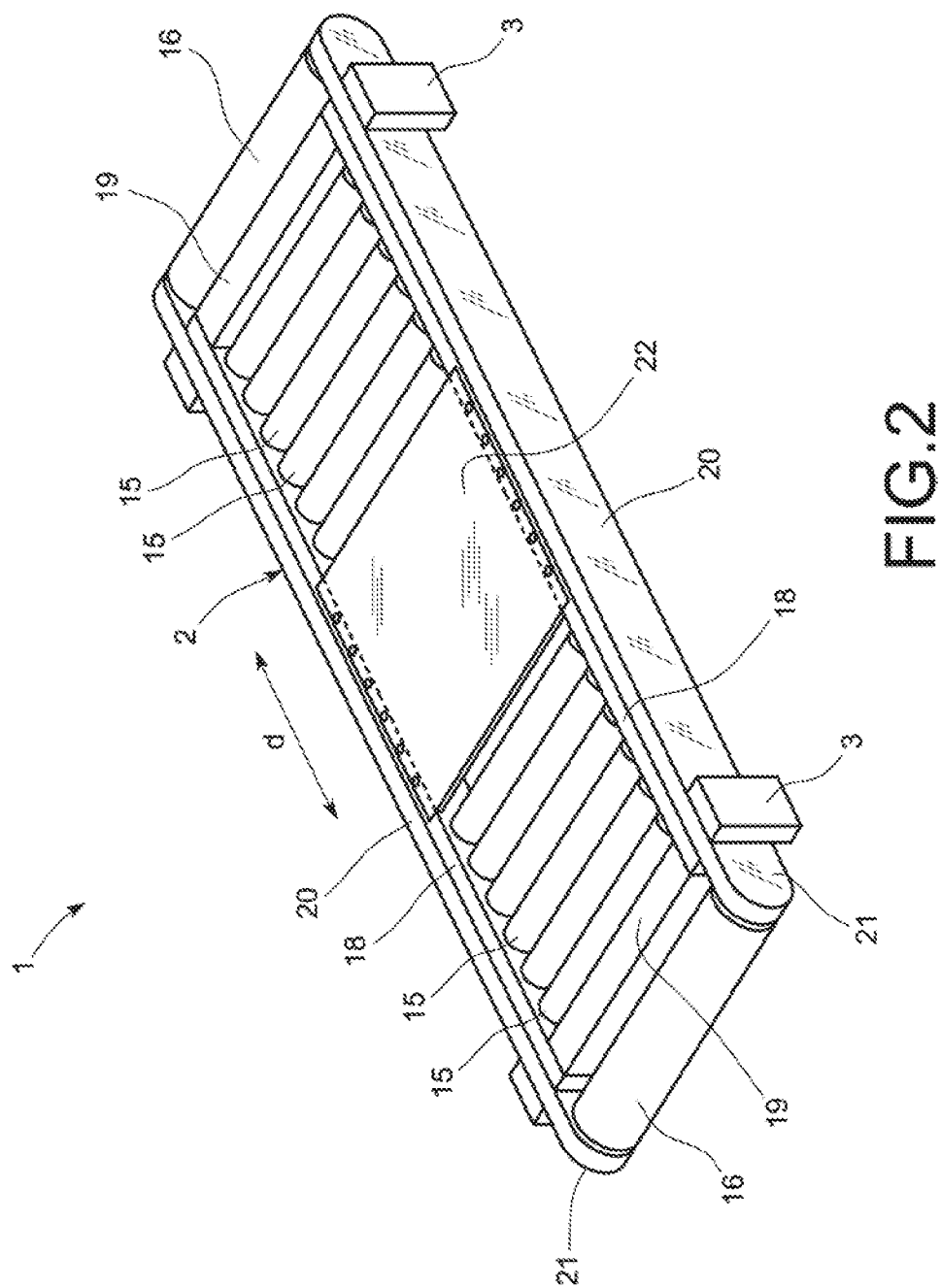
FIG. 2 shows a perspective view of the structure and the apparatus rollers of FIG. 1.
Figure 3:
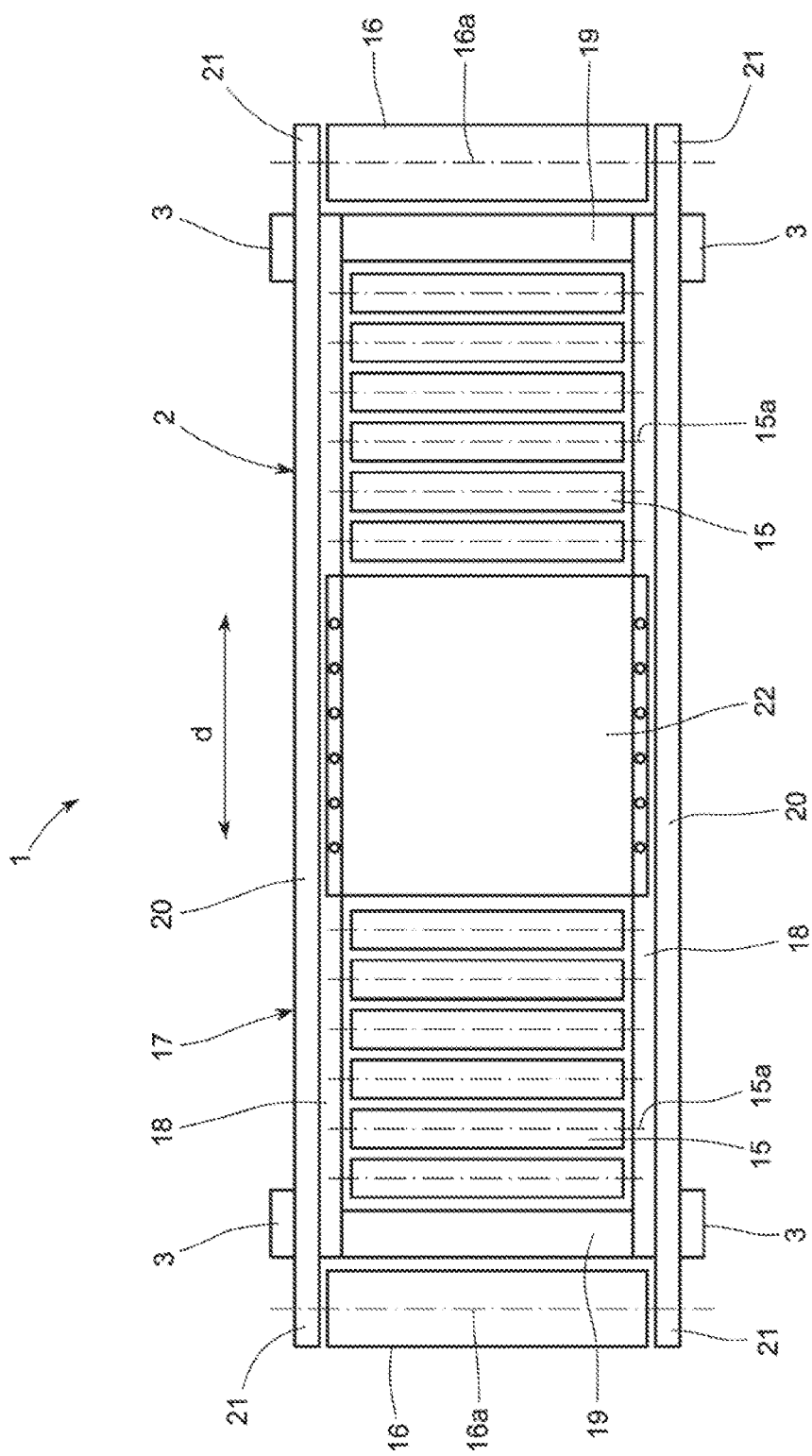
FIG. 3 shows a top plan view of the structure and the rollers of FIG. 2.

FIGS. 2 and 3 show a perspective view and a top plan view, respectively, of the apparatus (1) of FIG. 1 without the belt (4) and the securing element (9), As can be seen, the apparatus (1) of the present embodiment comprises a plurality of rollers (15, 16) arranged transversely, connected to the structure (2) and capable of turning with respect to the structure (2). Each roller (15, 16) turns with respect to its own rotation axis (15a, 16a), the rotation axes (15a, 16a) being parallel to one other. Although not illustrated in the drawings, an expert in the field can understand that the articulated connection between the rollers (15, 16) and the structure (2) that provides the corresponding rotation axis (15a, 16a), may be carried out by diverse methods commonly known in the prior art, for example via ball bearings placed between the structure (2) and the opposite ends of an axle (not illustrated) of the rollers (15, 16).

Figure 4:
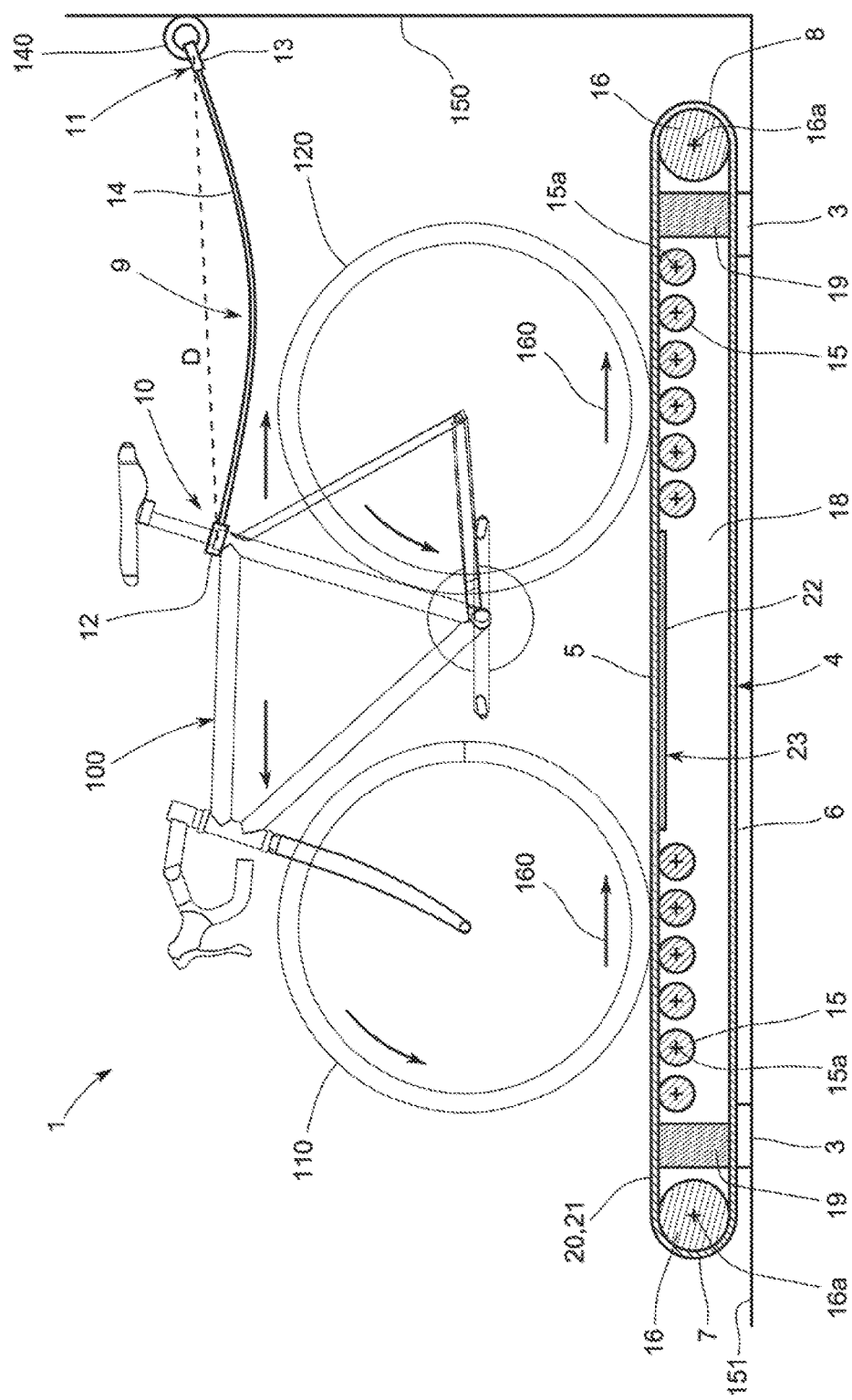
FIG. 4 shows a transverse cross-sectional view of the apparatus of FIG. 1 as per section plane A-A.

FIG. 4 shows a cross-sectional view of the apparatus (1) of FIG. 1, with a bicycle (100) placed on the apparatus (1). As per this embodiment, the rollers (15, 16) are characterised in that they rotate solely as a result of the friction force between the belt (4) and the rollers (15, 16). In other words, the rollers (15, 16) are not motorized or driven by any other automatic system, nor are they driven manually by means of a lever or any other mechanical manual system, but they rotate as a result of the friction force between the belt (4) and the rollers (15, 16) which occurs when the belt (4) turns with respect to the structure (2). This offers an autonomous training apparatus (1) that is durable, extremely effective and does not require any electrical power consumption.

The apparatus (1) described in the paragraphs above works as follows. Referring to FIGS. 1 and 4, when a user places his/her bicycle (100) on the upper face (5) of the belt (4) and operates the pedals of the bicycle (100), the wheels (110, 120) of the bicycle (100) rotate according to normal operation of a bicycle (100). On turning, the wheels (110, 120) exert a friction force (160) on the belt (4) which pushes the belt (4) and makes the belt (4) move backwards (with respect to a theoretic forward movement direction of the bicycle (100)), i.e. in a clockwise direction as per the position in FIG. 4. This friction force (160) is transferred to a friction force between the inner surface of the belt (4) and the rollers (15, 16), causing the rollers (15, 16) to individually turn in a clockwise direction. Thanks to the rotation of the rollers (15, 16), the belt (4) is able to rotate and, in turn, enables the wheels (110, 120) to turn, allowing the user to ride the bicycle and train as normal on the belt (4).

The securing element (9) carries out diverse, very relevant functions. On one hand, it limits the forward movement of the bicycle (100) and thus ensures that the bicycle (100) does not advance forward farther than a predetermined maximum extent as a result of the cyclist's pedalling. The presence of this securing element (9), and more specifically, the fact that it limits the forward movement of the bicycle (100) on the belt (4), is what allows that the friction force (160) between the wheels (110, 120) and the belt (4) to make the belt (4) turn in the opposite, rearward direction. In addition, the fact that the securing element (9) is flexible enables the bicycle (100) to present slight longitudinal movements with respect to the structure (2), as indicated by the arrows (170) in FIG. 1. Furthermore, the articulated connections of the connectors (12, 13) enable the bicycle to move sideways, as shown by the arrows (180) in FIG. 1. The bicycle (100) is also capable of tilting sideways, thanks to the fact that the securing element (9) is flexible and ends with articulated connections. In other words, the apparatus (1) as per the invention allows for longitudinal movement, transversal movement, lateral tilting, or combinations thereof. This leads to a natural pedalling experience in which the cyclist is not forced to pedal constantly in the same way; instead, the cyclist can vary his/her posture, pedalling rate, inclination, and even pedal standing up, more reliably simulating real pedalling conditions on the road.

The fact that the securing element (9) is placed longitudinally and secures the bicycle (100) from behind allows for a very effective control and limitation of the movement of the bicycle (100), and also enables the user to pedal naturally, almost forgetting that he/she is secured, hence maximising realism.

The securing element (9) may also be longitudinally elastic, or in other words, capable of stretching longitudinally (increasing its length) on the bicycle's (100) traction and returning to its initial length once the traction has ended. For example, the securing element (9) may comprise a rubber band, a spring or a combination thereof. This will enable the pull exerted by the securing element (9) on the bicycle (100) to be slightly cushioned when it reaches its most advanced longitudinal position, thus providing a smoother and more comfortable riding experience for the cyclist.

Preferably, as shown in FIGS. 2 to 4, the apparatus (1) comprises end rollers (16), around which the belt (4) is wrapped, or in other words, around which the end sides (7, 8) of the closed loop are formed. This allows for a simple and very effective construction of the rotating support on which the belt (4) rotates.

Preferably, at least a part of the upper face, said part extending from one end side (7) to the opposite end side (8) of the belt (4), is totally exposed to the exterior. In other words, as per the invention, the upper face (5) of the belt (4) is exposed to the exterior along its entire length, between the opposite end sides (7, 8) and along at least part of the width of the belt (4). This enables the longitudinal surface along which the user can move the bicycle (100) longitudinally to be maximised, even enabling the apparatus to be used with smaller bicycles, for example for children, in which case the bicycles will have a greater longitudinal run on the belt (4). In the illustrated embodiment, the entire upper face (5) extending from one end side (7) to the opposite end side (8) of the belt (4) is totally exposed to the exterior. This also allows the lateral movement of the bicycle on the belt (4) to be maximised and therefore offers the cyclist even more freedom of movement.

In the embodiment of FIG. 1, and as can be seen in FIGS. 2 and 3, the structure (2) comprises a frame (17) that is arranged in a longitudinal direction (d). The frame (17) of the present embodiment comprises two longitudinal crossbars (18), placed parallel to each other and in a spaced-apart configuration. At the ends of the crossbars (18) there are two crossbeams (19), secured rigidly to the crossbars (18). The crossbars (18) and crossbeams (19) form a rectangular structure, within which a series of internal rollers (15) is disposed, the rollers (15) being parallel to each other and parallel to the crossbeams (19). These internal rollers (15) are articulately connected to the crossbars (18) of the frame (17) and are capable of turning with respect to these crossbars (18). Respective external crossbars (20) are arranged outside the crossbars (18) and attached to the crossbars (18). These external crossbars (20) are longer than the crossbars (18), and have overhanging ends (21), as can be seen in FIG. 3. The end rollers (16) are arranged between these overhanging ends (21) and articulately connected to these overhanging ends (21). As can be seen in FIG. 4, the belt (4) is placed on top of and underneath the crossbars (18, 20), the crossbeams (19) and the rollers (15) and around the end rollers (16) at opposite ends of the frame (17). This embodiment is advantageous as its manufacturing cost is reasonable and it requires limited maintenance.

In the illustrated embodiment, the structure (2) further comprises a horizontal platform (22) placed under the belt (4) and secured to the structure (2), more specifically to the crossbars (18) of the frame (17). A subset of rollers (15, 16) is placed in front of the platform (22) and the rest of the rollers (15, 16) are placed behind this platform (22). The platform (22) provides a fixed surface below the belt (4) which enables the cyclist to stand up on the area of the belt (4) that lies just above the platform (22) to get on or get off the bicycle (100). In the embodiment illustrated, the platform (22) is located in longitudinal recesses (23) in the crossbars (18), so that the upper faces of the platform (22) and the crossbars (18) are flush. Alternatively, the platform (22) may be supported on the crossbars (18) and protrude slightly from their upper face.

Figure 5:
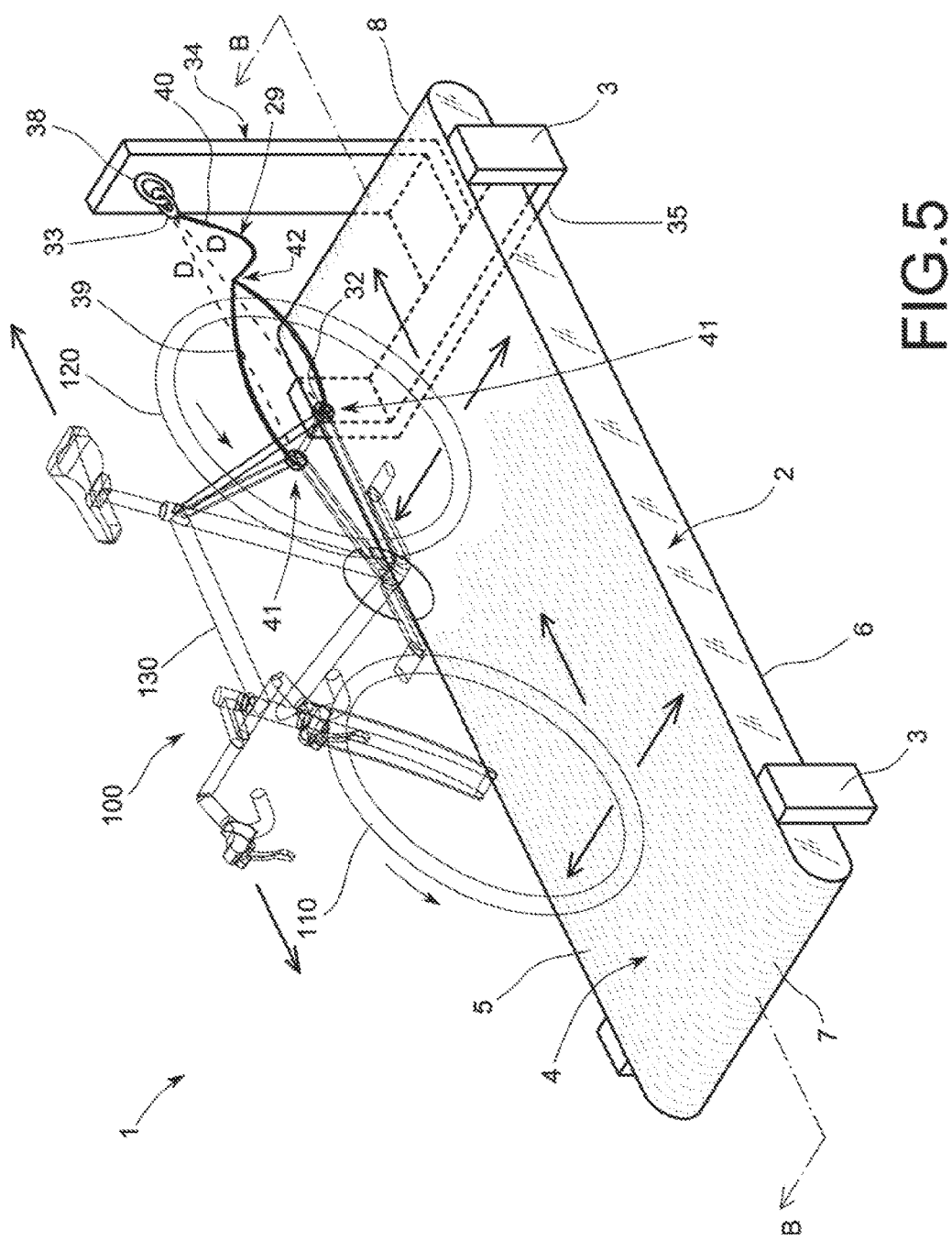
FIG. 5 shows a perspective view of a second embodiment of a training apparatus as per the invention.
Figure 6:
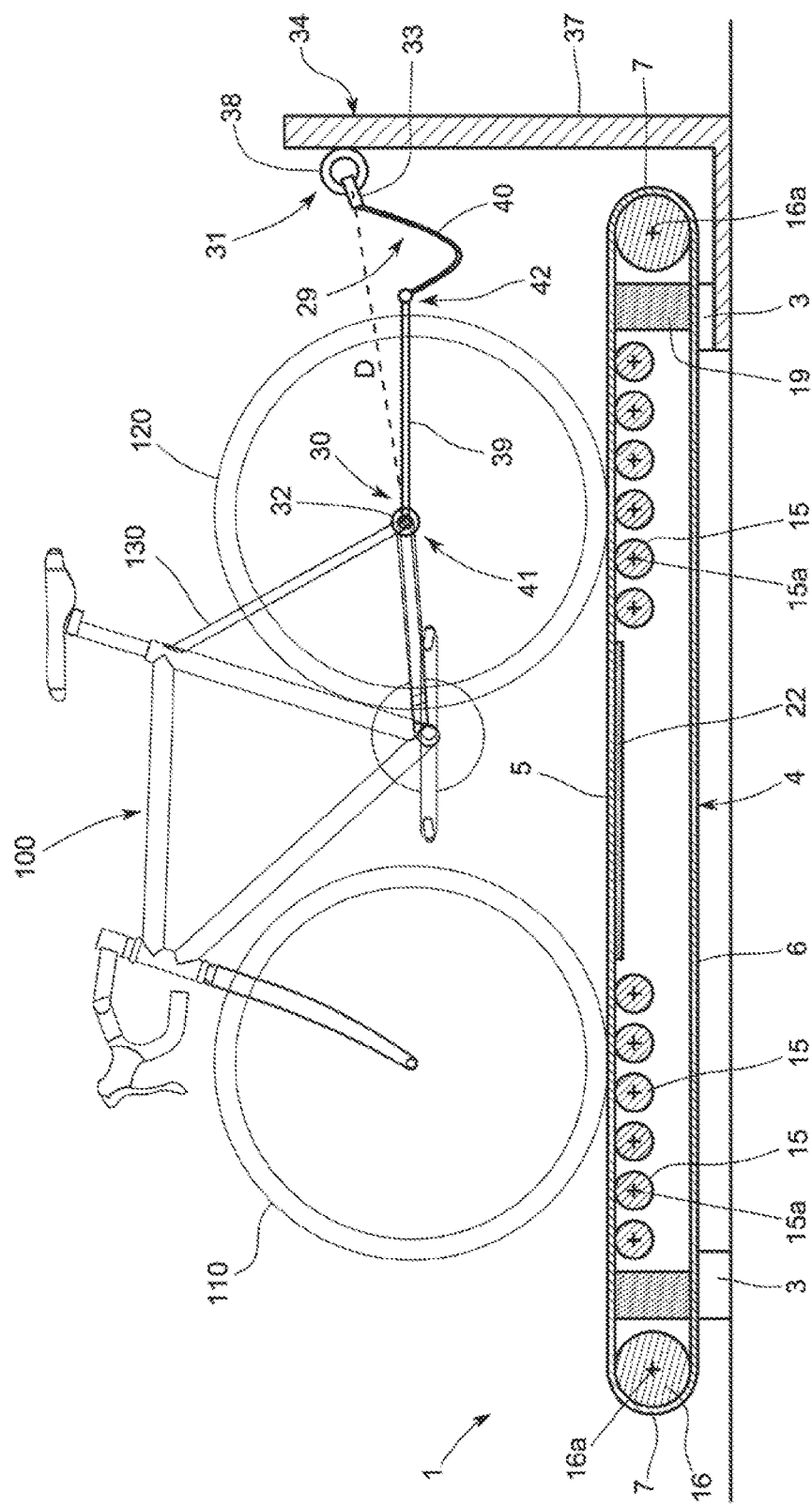
FIG. 6 shows a transverse cross-sectional view of the apparatus of FIG. 5 as per section plane B-B.

FIGS. 5 and 6 show a second embodiment of the invention, which as the previous embodiment consists in a training apparatus (1) comprising a structure (2) that is supported on the floor (151), a series of rollers (15, 16) placed transversally and articulately connected to the structure (2) and capable of turning with respect to this structure (2), and a belt (4) arranged in a closed loop, which travels over and under the rollers (15, 16), whereby this loop comprises an upper face (5) to support a bicycle (100). The apparatus (1) also comprises a securing element (29) that presents two opposite ends (30, 31), whereby one end (30) has a first connector (32) attached to a frame (130) of a bicycle (100), and the opposite end (31) has a second connector (33). The securing element (29) is flexible so that the distance (D) between these ends (30, 31) is variable. Furthermore, as in the previous embodiment, the rollers (15, 16) rotate driven solely by a friction force between the belt (4) and the rollers (15, 16).

In the present embodiment, unlike the previous one, the second connector (33) is attached to the structure (2) of the apparatus (1), instead of to a fixed point external to the apparatus (1). This allows the apparatus (1) to be autonomous and it does not need to be installed close to a wall, beam or similar. For instance, as shown in FIGS. 5 and 6, the structure (2) can include an ascending support (34) that provides a connection point for attaching the rear end (11) of the securing element (29), the connection point being arranged elevated with respect to the upper face (5) of the closed loop. The ascending support (34) of the present embodiment is secured to a transversal piece (35) that extends between the two rear legs (3) of the structure (2), and is formed as an L-shaped extension comprising a horizontal portion (36) and a vertical portion (37). The upper part of the vertical portion (37) has a fixing element (38), for example an eyebolt, to secure the second connector (33) of the securing element (29). Notwithstanding, alternative embodiments are contemplated. For instance, it is contemplated that the apparatus can include more than one vertical ascending supports, or one or more longitudinally and/or transversely oblique ascending supports. In summary, it is contemplated that the structure can include a connection point that is elevated and preferably rearward with respect to the upper face of the closed loop, the connection point including the fixing element for attaching the read end of the securing element.

Furthermore, in this embodiment, the securing element (29) comprises a rigid fork (39) and a flexible elongated element (40), which can be a cable, a chain, a rope, a rubber band or the like, or a combination thereof. The rigid fork (39) has two free ends (41) which define the first end (30) of the securing element (29), wherein these free ends (41) are configured to be attached to opposite sides of the rear of a bicycle (100) frame (130). The rigid fork (39) also has an opposite end (42) to these free ends (41). The flexible elongated element (40) is connected to this opposite end (42) of the rigid fork (39). Connecting the flexible elongated element (40) to the bicycle (100) by means of a rigid fork (39) reduces the risk of the flexible elongated element becoming tangled up in the rear wheel (120) when the apparatus (1) is in use, and therefore leads to increased safety for the user and the bicycle (100).

Optionally, the apparatus can include an adjustable braking mechanism for the rollers (5, 6), allowing the user to vary the friction of the rollers (5, 6) on turning them and hence to adjust the pedalling effort required to move the belt (4). Examples of braking mechanisms are at least one of a mechanic brake using friction brake shoes, a hydraulic brake (using the resistance generated by a viscose fluid), a magnetic brake (using the magnetic resistance of the magnets), or any other brakes known in the prior art or which are developed with the ability to brake a rotating roller may be used.

Figure 7:
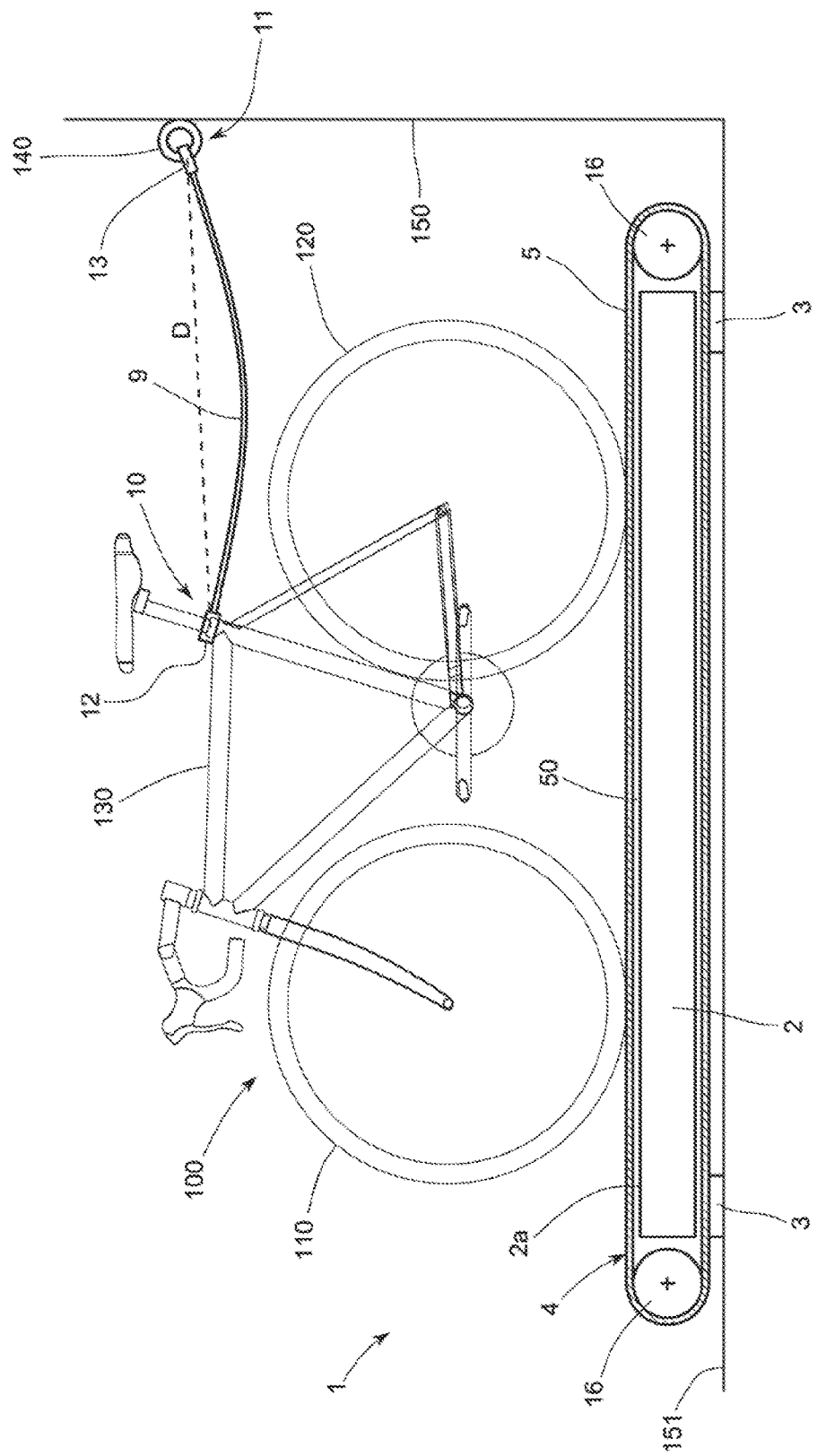
FIG. 7 shows a transverse cross-sectional view of a third embodiment of the invention.
Figure 8:
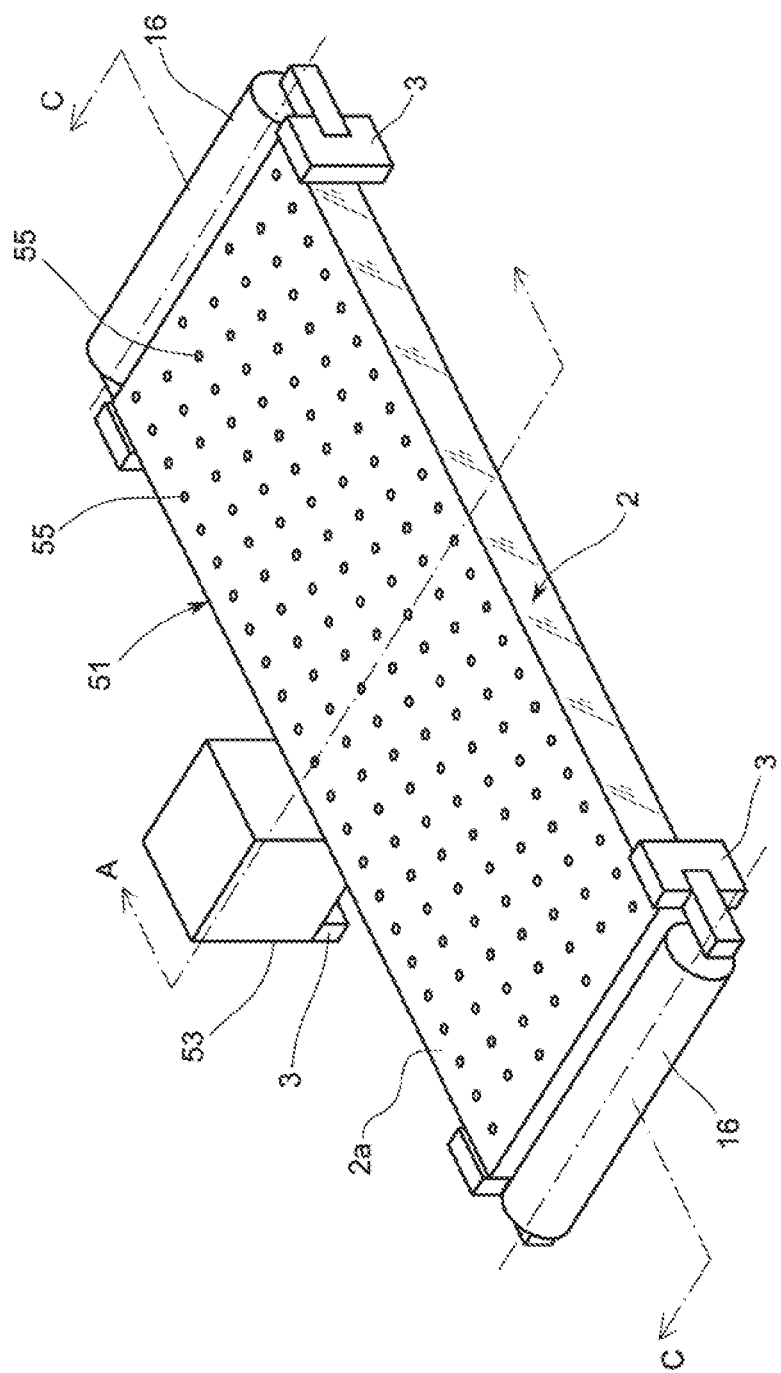
FIG. 8 shows a perspective view of the structure of the embodiment of FIG. 7, without the belt, revealing holes on the upper side of the structure.
Figure 9:
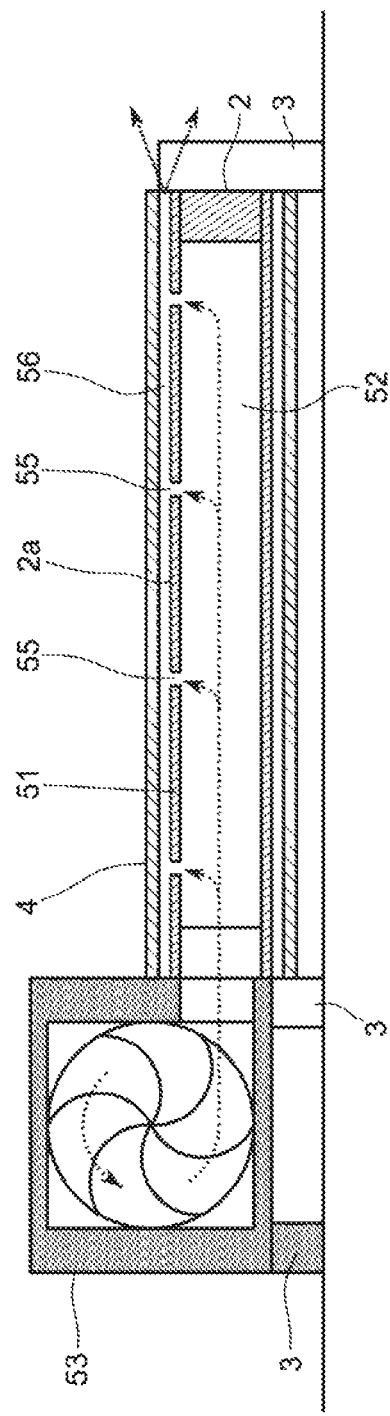
FIG. 9 shows a transverse cross-sectional view of the apparatus of FIG. 8 as per sectional plan C-C indicated in FIG. 8.

FIG. 7 shows a lateral sectional view of another embodiment of the invention, consisting in a cycling training apparatus (1) comprising a structure (2), which is supported on the floor (151) via legs (3), and a belt (4) that is movable with respect to the structure (2). As in the previous embodiments, the belt (4) is arranged in a longitudinal closed loop comprising an upper face (5) for supporting a bicycle (100). Furthermore, the apparatus (1) includes a securing element (9) having two opposite ends (10, 11), wherein one end (10) has a first connector (12) configured to be attached to the bicycle (100), and the opposite end (11) has a second connector (13) configured to be attached to a fixed point external to or comprised in the apparatus (1), for example to a fixed point (140) such as an eyebolt secured to a wall (150). The securing element (9) is flexible so that the distance (D) between the ends (10, 11) is variable, allowing for longitudinal and/or transversal movement and lateral tilting of the bicycle (100). The apparatus (1) of the present embodiment has the special feature that between the belt (4) and at least part of the structure (2)—in this case, between the belt (4) and an upper face (2a) of the structure (2)—there is an air film (50) which enables the friction between the belt (4) and this part of the structure (2) to be minimised. FIGS. 8 and 9 allow for further understanding of the structure (2) of the present embodiment. More specifically, the structure (2) comprises an upper plate (51) whose outermost surface defines the upper face (2a) of the structure (2). The structure (2) also includes an interior cavity (52) and an air current generator (53) placed in such a way that an air flow is generated and this air is injected into the interior cavity (52) to via the lateral opening (54) of the structure (2). The air current generator (53) may be a ventilator, a blowing apparatus, a compressor, a turbine or similar. The air, as indicated by the dotted arrows in FIG. 9, penetrates into the interior cavity (52), passes through holes (55) included in the upper plate (51) and passes to a space (56) between the belt (4) and the upper face (2a) of the upper plate (51), forming the aforementioned air film (50) between the belt (4) and the upper face (2a) of the upper plate (51) which reduces the friction between them and enables the belt (4) to rotate in the form of a loop. The air flow finally exits to the exterior at, for example, at least one edge of the space (56); for instance, in the present embodiment the air is discharged via the opposite side to the side of the structure (2) where the air current generator (53) is located. The apparatus (1), as in the previous embodiments, can include roller ends (16) around which the belt (4) is wrapped.

Figure 10:
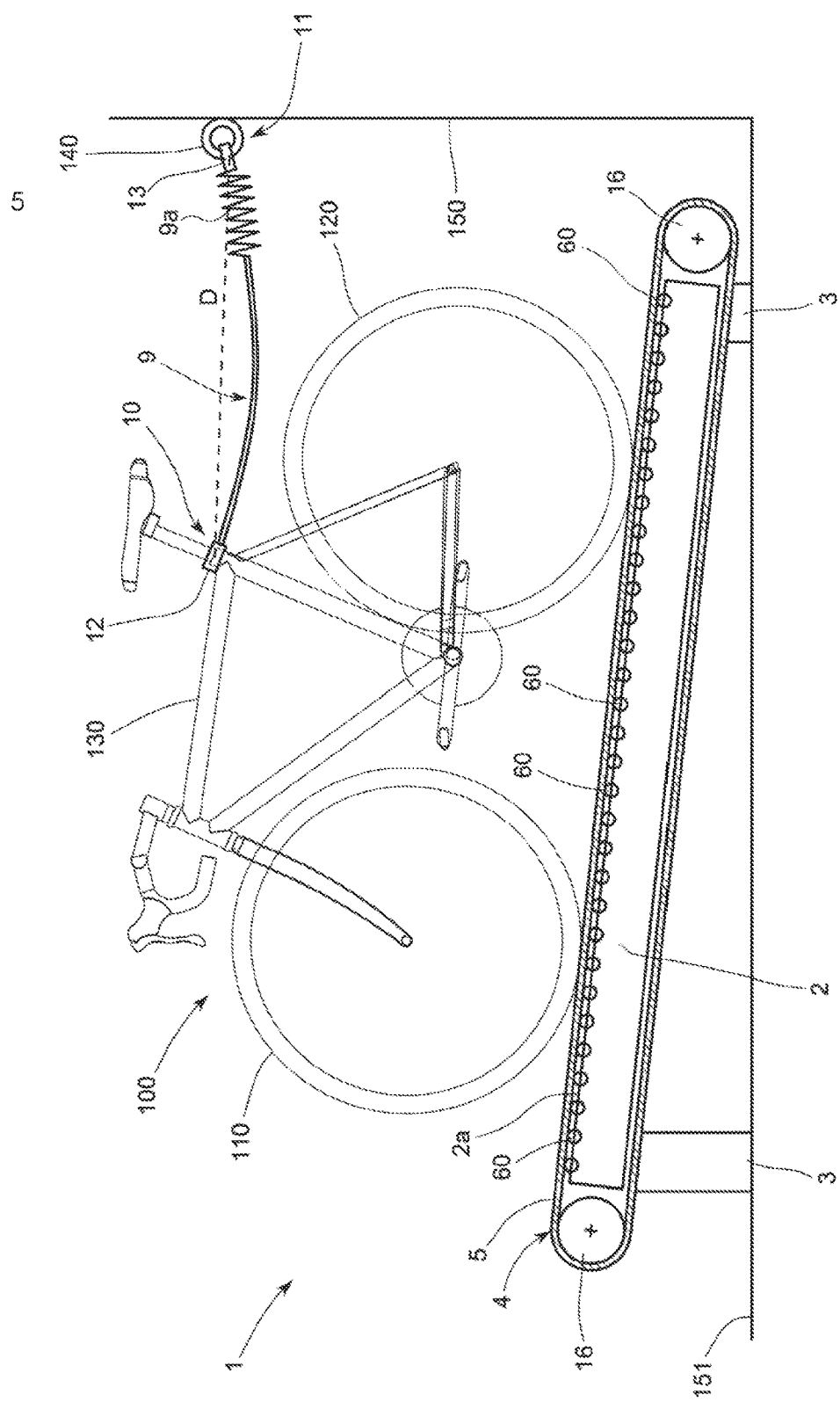
FIG. 10 shows a transverse cross-sectional view of a fourth embodiment of the invention.

FIG. 10 shows a lateral sectional view of another embodiment of the invention, consisting in a cycling training apparatus (1) comprising a structure (2) which is supported on the floor (151)—in this case, by legs (3)—and a belt (4) that is movable with respect to the structure (2). Like in the previous embodiments, the belt (4) forms a longitudinal closed loop including an upper face (5) for supporting a bicycle (100). Furthermore, the apparatus (1) comprises a securing element (9) having two opposite ends (10, 11), whereby one end (10) has a first connector (12) configured to be attached to the bicycle (100), and the opposite end (11) has a second connector (13) configured to be attached to a fixed point external to or comprised in the apparatus (1), for example to a fixed point (140) such as an eyebolt secured to a wall (150). The securing element (9) is flexible so that the distance (D) between the ends (10, 11) is variable, enabling longitudinal and/or transversal movement, and the lateral tilting, of the bicycle (100). In the present embodiment, the securing element (9) comprises, as way of example, a spring (9a). Furthermore, the apparatus (1) in this embodiment has the special feature whereby balls (60) are secured to the structure (2), each ball (60) being capable of rotating around a respective transversal rotation axis that passes through the centre of the ball (60), like bearings. The balls (60) are distributed longitudinally and transversally along an upper face (2a) of the structure (2), protruding upwards from this upper face (2a). The highest points of the balls (60) are coplanar. The belt (2) wraps around the balls (60) so that it is capable of moving with minimum friction with respect to the structure (2). The structure (2) of the present embodiment is resistant and effective, and also has a relatively simple and economic construction, due to the fact that it is possible to use balls that are commercially available, among other reasons. The apparatus (1), as in the previous embodiments, can include roller ends (16) around which the belt (4) is wrapped.

In some embodiments of the invention, it is contemplated that the upper face of the belt may be tilted with respect to the floor (151) to simulate real-life uphill pedalling. To do so, the upper portion of the structure which is below the belt will preferably be tilted like the belt, and the rotation axis of the rollers or balls, if appropriate, will be placed in an ascending configuration to allow the highest points of the rollers or balls to be on an inclined plane that will determine the inclination of the belt. For example, in the embodiment of FIG. 10, the upper face (2a) of the structure (2) is tilted upwards and the balls (60) are placed in an ascending height (in the direction of the theoretic movement of the bicycle (100)). Alternative embodiments based on rollers or on an air film may also have a tilted belt (4), for which the rollers (15, 16) or the space (56) arranged between the belt (4) and the upper face (2a) of the upper plate (55) can be arranged in a tilted fashion.

It is also contemplated that the apparatus (1) can include an electric motor to move the belt (4), by driving the rollers (15, 16) or balls (60) in the previously described embodiments, in order to help the cyclist by eliminating certain friction and hence provide an even more realistic cycling experience.

Furthermore, it is contemplated that the apparatus may comprise electronics that allows for at least one of the following functions: cardio reading, kilometers travelled, power developed, 'slope', calories, screen with circuit and Internet connection for on-line races.

It is also contemplated that the apparatus (1) may include additional elements such as a ventilator that blows air over the cyclist depending on the speed of rotation of the belt.

The invention claimed is:

1. A cycling training apparatus, comprising:
a structure that is supported on a floor or surface,
a belt that is movable with respect to the structure, wherein said belt is formed in a longitudinal closed loop that comprises an upper face on which to ride a bicycle,
a securing element including two opposite ends, comprising a first connector on one end configured to be attached to a bicycle, and comprising a second connector on the other end configured to be attached to a fixed point wherein said securing element comprises a rigid fork and a flexible elongated element, wherein the rigid fork has two free ends which define the first end of the securing element, wherein each of the free ends is configured to be attached to one opposing side of a rear area of a bicycle, and an opposite end opposing said free ends, whereby the flexible elongated element is connected to said opposite end and wherein the flexible elongated element is flexible so that the straight line distance between said ends is variable.

2. The cycling training apparatus of claim 1, wherein the securing element is arranged longitudinally and the first connector is configured to be attached to a rear area of the bicycle.

3. The cycling training apparatus of claim 1, wherein the belt is exclusively driven by a friction force exerted by wheels of the bicycle when a user carries out a pedalling action on a bicycle arranged on said upper face.

4. The cycling training apparatus of claim 1, further comprising an electric motor to drive the belt.

5. The cycling training apparatus of claim 1, wherein the second connector is attachable to a fixed point external to the apparatus.

6. The cycling training apparatus of claim 1, wherein the second connector is attachable to the structure of the apparatus.

7. The cycling training apparatus of claim 6, wherein the structure includes an ascending support comprising a fixing element compatible with the second connector of the securing element.

8. The cycling training apparatus of claim 1, further comprising end rollers, around which the belt is arranged.

9. The cycling training apparatus of claim 1, wherein the closed loop comprises two longitudinal end sides, and an upper face and a lower face which are arranged from one of said end sides to the other of said end sides, wherein at least part of a transverse width of the upper face is completely exposed to the exterior.

10. The cycling training apparatus of claim 9, wherein the entire upper face which extends from one end side to the opposite end side of the belt is completely exposed to the exterior.

11. The cycling training apparatus of claim 1, wherein the securing element comprises at least one of a rope, a chain and a cable.

12. The cycling training apparatus of claim 1, wherein the securing element is longitudinally elastic.

13. The cycling training apparatus of claim 12, the securing element comprises at least one of a rubber band and a spring.

14. The cycling training apparatus of claim 1, further comprising a set of rollers arranged transversally, articulately connected to the structure and capable of rotating with respect to said structure, wherein the belt moves over and below the rollers.

15. The cycling training apparatus of claim 14, wherein the structure comprises a frame, arranged in a longitudinal direction, and the rollers are articulately connected to the frame and are capable of rotating with respect to the frame, wherein the belt wraps over and under the frame and the rollers and around opposing end rollers at opposite ends of the frame, the belt comprising an upper face, a lower face and two opposite longitudinal end sides, wherein the upper face is totally exposed to the support of a bicycle.

16. The cycling training apparatus of claim 1, wherein the structure comprises a platform placed immediately below the belt in a central area of the belt.

17. The cycling training apparatus of claim 1, wherein an air film is formed between the belt and at least part of the structure.

18. The cycling training apparatus of claim 1, further comprising balls connected to the structure, wherein each ball is capable of rotating at least about a respective transversal rotation axis that passes through the centre of the ball, whereby these balls protrude from an upper face of the structure and coplanarly contact the belt.

* * * * *